J. SMITH.
Cultivator.
No. 207,778. Patented Sept. 3, 1878.
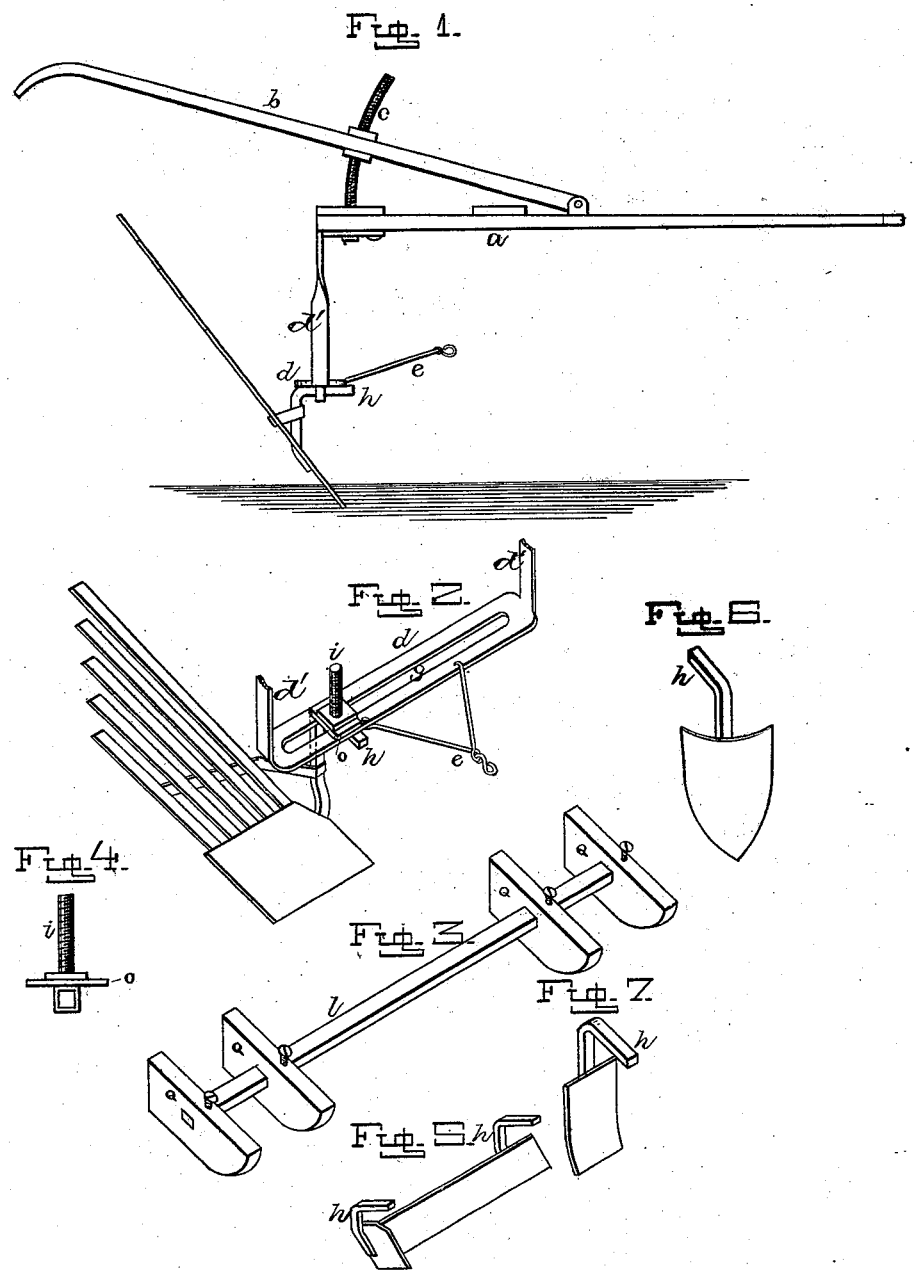

UNITED STATES PATENT OFFICE.

JOSEPH SMITH, OF ELYRIA, OHIO.

IMPROVEMENT IN CULTIVATORS.

Specification forming part of Letters Patent No. 207,778, dated September 3, 1878; application filed August 12, 1878.

*To all whom it may concern:*

Be it known that I, JOSEPH SMITH, of Elyria, in the county of Lorain and State of Ohio, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cultivators; and it consists in the combination of a suitable wooden frame with a slotted iron frame or bar depending therefrom, up through the slot in the said frame being passed suitable clamping-bolts for securing each separate attachment in position for use, as will be more fully described hereinafter.

The accompanying drawings represent my invention.

Figure 1 is a side elevation of my invention. Fig. 2 is a perspective of the slotted plate to which the attachments are fastened. Figs. 3, 4, 5, 6, 7 are detail views of the various attachments.

$a$ represents a light wooden frame, adapted for a single animal, and which is provided with handles $b$, that can be adjusted up and down by means of the curved screw-rods $c$. Secured to the under side of the rear end of the frame is the wide slotted plate or frame $d\ d'$, which is much wider along its middle than at its ends $d'$, the said ends being bent at right angles to the slotted portion, and twisted so that their extreme upper parts can again be bent so as to be in line with the shafts of the frame. The distance between the slotted plate $d$ and the under side of the frame $a$ being considerable, the draft-rod $e$ is attached direct to the plate, near each end, so that the draft of the animal may be applied directly to the plate, and thus prevent the ends from being bent or broken by the great strain upon them.

Up through the long slot $g$ in the plate $d$ are passed the screw-bolts $i$, which have eyes or hooks on their lower ends for the bent arms $h$ of the various attachments to pass through. The washers $o$ are passed down over the tops of the bolts $i$, and then the nuts are screwed down upon the washers until the lower ends of the bolts are drawn up through or into the slot $g$ to tightly clamp the bent arm of the attachment against the under side of the plate $d$, where it will be held in position ready for use.

The attachments to be used with this cultivator are numerous, among which is a potato-digger, square and sharp pointed shovels, scrapers or cutters, and all the various devices used in cultivating crops of all kinds. These attachments may be used singly or two or more together, as may be preferred.

When it is desired to lay off a field for planting corn, all of the attachments are removed from the plate $d$, and the corn-marker $l$ is connected to it by the screw-hooks. This marker consists of a long bar, upon which are movably attached a number of markers, Q.

Having thus described my invention, I claim—

In a cultivator, the combination of the frame $a$, handles $b$, slotted plate or frame $d\ d'$, clamping screw rods or bolts $i$, and the bent arms $h$, for the attachment of different implements, substantially as shown and described.

In testimony that I claim the foregoing I have hereunto set my hand this 1st day of August, 1878.

JOSEPH SMITH.

Witnesses:
C. W. DICKINSON,
JOHN HOBBS.